United States Patent [19]

Miller et al.

[11] Patent Number: 4,523,931
[45] Date of Patent: Jun. 18, 1985

[54] FABRIC FILTER SYSTEM WITH IMPROVED GAS BYPASS MEANS FOR REMOVING PARTICULATE MATTER FROM GASES

[75] Inventors: Richard L. Miller, Womelsdorf; Carlos Estela, Myerstown, both of Pa.

[73] Assignee: General Electric Environmental Services, Inc., Lebanon, Pa.

[21] Appl. No.: 502,853

[22] Filed: Jun. 9, 1983

[51] Int. Cl.³ .............................................. B01D 50/00
[52] U.S. Cl. .......................................... 55/80; 55/97; 55/269; 55/314; 55/341 MC; 55/341 PC
[58] Field of Search ..................... 55/80, 96, 267, 269, 55/302, 303, 312–314, 417, 418, 341, 344, 341 PC, 341 MC, 97; 137/599, 599.1

[56] References Cited

U.S. PATENT DOCUMENTS

| | | | |
|---|---|---|---|
| 2,983,213 | 5/1961 | Bohanon | 55/418 X |
| 3,057,137 | 10/1962 | Perlis et al. | 55/303 |
| 3,401,506 | 9/1968 | Burdock | 55/344 |
| 3,834,125 | 9/1974 | Richter | 55/208 |
| 3,898,062 | 8/1975 | Slakey | 55/269 |
| 3,945,400 | 3/1976 | Slakey | 137/885 |
| 3,963,467 | 6/1976 | Rolschau | 55/418 X |
| 4,133,659 | 1/1979 | Beckman | 55/314 |
| 4,239,061 | 12/1980 | Peterson | 55/314 |
| 4,360,370 | 11/1982 | McAndrew | 55/302 |
| 4,376,638 | 3/1983 | Dunseith | 55/96 X |
| 4,424,069 | 1/1984 | Chang | 55/344 X |

Primary Examiner—Charles Hart
Attorney, Agent, or Firm—Ernest F. Chapman

[57] ABSTRACT

An internal flue gas bypass system is provided in a baghouse filter system having a plurality of filter compartments each having a gas inlet for receiving particulate-laden gas, a gas outlet for delivering filtered gas, fabric filter means between the gas inlet and the gas outlet, means for selectively blocking the gas inlet of each compartment, a gas inlet manifold connected to a source of particulate-laden gas and to the gas inlet of a plurality of filter compartments, and a gas outlet manifold connected to the gas outlet of a plurality of filter compartments and to a baghouse clean gas outlet. At least a portion of the gas outlet manifold has a common wall with the gas inlet manifold so that the gas outlet manifold is mounted internally in the baghouse adjacent the gas inlet manifold, and at least one poppet damper means is positioned in the common wall thereby providing an internal bypass means for passing particulate-laden gas from the gas inlet manifold to the gas outlet manifold. In one embodiment, the gas inlet of each compartment is blocked, and the poppet damper means in the common wall is opened so that heated, particulate-laden gas passes through the gas inlet manifold to the gas outlet manifold, thereby providing a method of heating the gas inlet manifold to a desired temperature prior to passing the heated, particulate-laden gas into a plurality of filter compartments.

22 Claims, 5 Drawing Figures

FABRIC FILTER SYSTEM WITH IMPROVED GAS BYPASS MEANS FOR REMOVING PARTICULATE MATTER FROM GASES

BACKGROUND OF THE INVENTION

The present invention relates generally to an apparatus for filtering solids from a particulate-laden stream of gas, and more particularly, to an improved gas bypass system and method in a baghouse fabric filter system.

Baghouses are generally employed to separate particulate matter from gas streams, for example, to separate fly ash and other undesirably particulate matter from a boiler flue gas stream, by fabric filtration with fabric filter means generally known as bag filters. Fabric filtration with fabric filter means is not limited to air pollution control, but may also be employed in resource recovery applications where it is an object to recover particulate matter from a gas stream.

The filtration of the particulate matter from particulate-laden gas is carried out in filter houses, known in the trade as baghouses, which include a plurality of fabric bag filters suspended, generally, open-end down, within a plurality of compartments within the baghouse. Particulate-laden gas, such as flue gas containing fly ash particles resulting from the burning of coal, is directed upwardly into each of the bags within a given compartment, such that particulate matter collects inside the bags as a filter cake. Gas is forced to flow through the compartment by either a blower fan or a suction fan, and accordingly, there is a pressure drop across the filters depending upon their resistance to gas flow. As a filter cake accumulates on the bag surfaces, gas flow resistance increases, thereby decreasing gas flow and increasing pressure drop which must then be overcome by the fan. In order to decrease gas flow resistance and thereby increase gas flow and decrease pressure drop, the bag filters or fabric filter means are periodically cleaned to remove the accumulated filter cake.

The particulate-laden gas, for example, derived from the burning of coal, is a hot stream of flue gas directed from a boiler unit or other source by a suitable conduit into a gas inlet manifold of the baghouse filter system. The gas inlet manifold is connected to the gas inlet of a plurality of filter compartments, and the hot, particulate-laden gas is directed into selective gas inlets of a plurality of filter compartments. Generally, means are provided for selectively blocking the gas inlet of each compartment, and the flow of the hot, particulate-laden gas passes through the gas inlet and into the filter compartment in those filter compartments which are not selectively blocked.

Fabric filter collection systems which remove and collect particulate matter from gas streams which are corrosive, explosive and/or operate at high temperatures typically require bypass systems. The gas bypass systems are required to protect the filter bags and/or the process equipment from damage due to system upsets or irregularities. Most of the prior art bypass systems are external to the fabric filter casing, that is, they are located in the conduit carrying the gas stream from the source to the gas inlet manifold, and most generally the prior art flue gas bypass systems are located at the point where the flue gas stream enters the gas inlet manifold. The external gas bypass system permits ease of maintenance due to the fact that there is good accessibility to the isolation dampers regardless of the type of isolation dampers used, for example, butterfly dampers, louvers and the like.

In baghouse filter systems, prior art internal gas bypass systems have been disadvantageous because of inaccessibility of the isolation dampers, and since most dampers commonly used in such systems, for example, butterfly dampers and louvers, require regular maintenance, internal bypass systems have been discouraged because maintenance was virtually impossible except during system shutdowns. The isolation dampers generally require frequent maintenance because the bearings and seals fail due to the heat, dust and the acidic environment, especially when the baghouse filter systems are used in conjunction with the hot, particulate-laden gases derived from boilers.

The external bypass systems have also been disadvantageous because they typically require excessive amounts of real estate for their positioning and location external to the fabric filter casing or baghouse housing. For example, an external bypass system requires as much as 20 to 25 additional feet of space on baghouses used for filtering the flue gas from the boilers of a large power plant. Not only do external gas bypass systems require extra real estate, but they also involve additional expense due to the large amounts of steel plate and due to the insulation of various areas to prevent exposure of certain parts to heat.

Typical baghouse filter construction is shown in U.S. Pat. No. 3,057,137; U.S. Pat. No. 3,898,062; and U.S. Pat. No. 3,945,400. In U.S. Pat. No. 3,898,062 and U.S. Pat. No. 3,945,400, the gas inlet manifold and gas outlet manifold do not share a common wall within the fabric filter casing. In U.S. Pat. No. 3,057,137, the gas inlet manifold and gas outlet manifold have a common wall, and the gas inlet manifold and gas outlet manifold are spaced between the pair of spaced housings, each of which contains a plurality of filter elements, and the housings thus provide a pair of spaced walls which are generally parallel and co-extensive with each other and which are utilized to form, in part, the inlet gas manifold and the outlet gas manifold. In one preferred embodiment of U.S. Pat. No. 3,057,137, the inlet gas manifold and outlet gas manifold are horizontally disposed and are substantially co-extensive in length with the two housings which make up the filter compartments. As described in U.S. Pat. No. 3,057,137, a top wall of the gas inlet manifold is preferably inclined in order to reduce the cross-section of the inlet duct progressively away from the inlet end which is connected to a source of gas to be cleaned. The outlet duct in U.S. Pat. No. 3,057,137 shares a common wall with the inlet gas manifold, so that the top wall of the inlet gas manifold forms the bottom wall of the gas outlet manifold. The outlet gas manifold of the filter system of U.S. Pat. No. 3,057,137 is of progressively increasing cross-section in the direction of gas flow and is of maximum size at the outlet end which is the opposite end of the housing from the inlet end. There appears to be no discussion in U.S. Pat. No. 3,057,137 of a gas bypass system.

A system for removing gaseous pollutants, such as, sulfur oxides, from gases wherein the system has an internal bypass capability is described in U.S. Pat. No. 4,133,659. In U.S. Pat. No. 4,133,659, the gaseous pollutants are removed from gases in one or more beds of activated charcoal formed in a housing along with passages for permitting the passage of the gases directly from the housing inlet to the outlet and passages for permitting the passage of gases from the inlet across the beds of activated charcoal to the outlet. Damper means are associated with the passages for permitting the passage of gases directly from the housing inlet to the outlet, the dampers being movable from an open position in which the gases pass through the first passages and a closed position in which the gases are directed through the second passages, that is, the passages for permitting the passage of gases from the inlet across the bed of activated charcoal to the outlet. In the event of a malfunction of the absorber, that is, the system for removing the gaseous pollutants, or any ancillary equipment connected thereto, damper units can be opened which permits a direct flow of the gases from the inlet through the passages to the outlets and thereafter to the stack, thereby bypassing the beds of charcoal.

Various damper plates as described in U.S. Pat. No. 4,133,659 are used for controlling the flow of gases through the passages, for example, one damper unit includes a single damper plate which is hinged relative to the partition and which can be moved by a wire hoist from an open position in which a corresponding opening formed in the partition is exposed, to a closed position. In another embodiment, a dual-leaf configuration is pivotably mounted relative to the partition and adapted to swing from a open horizontal position to a closed vertical position. It appears that there is no discussion of poppet damper means to direct the gases into the various passages to bypass the columns of activated charcoal or to direct the gases through the columns of activated charcoal. Furthermore, there is no suggestion of the use of a gas outlet manifold having a wall substantially common with the gas inlet manifold over the longitudinal direction of the gas inlet manifold. By examining the teachings of U.S. Pat. No. 4,133,659, it can be seen that the absorber unit for removing gaseous pollutants from gases and which has the internal bypass capability, is not of the type which could be construed as a dust collector system for removing particulate matter from particulate-laden gases because U.S. Pat. No. 4,133,659 teaches the separate use of a dust collector immediately following a boiler unit and thereafter a separate absorber unit for removing the gaseous pollutants after the particulate matter has been removed by a dust collector.

Poppet damper means, for example, poppet valves for baghouse outlet units have been described in the prior art, and in U.S. Pat. No. 4,360,370, there is described the use of poppet valves positioned in openings through which dust-free gas can pass from the filter compartment into a clean gas plenum. The poppet valve comprises a valve plate affixed to a valve stem that is mounted for translational motion in the opening so that the valve plate can cover the opening when the opening is to be closed and can be moved away from the opening when the opening is to be unclosed. There appears to be no suggestion in U.S. Pat. No. 4,360,370 of providing an internal gas bypass system by direct communication between the gas inlet manifold and the gas outlet manifold.

As used herein, a "baghouse" which may also be referred to more generically herein as a "fabric filter system", comprises a plurality of "compartments", also designated as "filter compartments." Each "compartment" is an independent structure, and is normally separated from other compartments within the same baghouse by walls, and is controllably separated from common inlet and outlet gas ducts by dampers or appropriate valves. Each compartment includes multiple bags, typically arranged in rows and columns. The baghouse including the plurality of compartments and the plurality of fabric filter means in each compartment, as well as the gas inlet manifold and gas outlet manifold, is referred to herein as a fabric filter system.

SUMMARY OF THE INVENTION

It is the primary object of the present invention to provide an internal gas bypass system in a baghouse filter system.

It is another object of the present invention to provide a gas bypass system in a baghouse system which reduces the size of the area required for the construction of the baghouse system.

Another object of the present invention is to provide a baghouse filter system having an improved gas bypass system wherein the gas bypass system utilizes gas manifolds which serve other purposes within the baghouse filter system, thereby eliminating separate duct work for the bypass system and conserving construction materials.

Another object of the present invention is to provide a baghouse filter system having internal bypass means for enabling the direct passage of gases from the boiler to the outlet end of the baghouse filter system in the event of system upsets or irregularities in the system.

Still another object of the present invention is to provide a baghouse filter system wherein the gas inlet manifold and adjacent areas are heated by the flue gas as the flue gas enters the cold gas inlet manifold.

Other objects and advantages will be apparent from the following description.

In accordance with the objects of the invention, there is provided a baghouse filter system comprising:

(a) a plurality of filter compartments each having a gas inlet for receiving particulate-laden gas, a gas outlet for delivering filtered gas, fabric filter means between the gas inlet and the gas outlet and means for selectively blocking the gas inlet of each compartment;

(b) a gas inlet manifold connected to a source of particulate-laden gas and to the gas inlet of a plurality of filter compartments;

(c) a gas outlet manifold connected to the gas outlet of a plurality of filter compartments and to a baghouse clean gas outlet, at least a portion of the gas outlet manifold having a common wall with the gas inlet manifold, whereby the gas outlet manifold is mounted internally in the baghouse adjacent the gas inlet manifold; and (d) at least one poppet damper means in the common wall, thereby providing an internal bypass means for passing particulate-laden gas from the gas inlet manifold to the gas outlet manifold.

The internal gas bypass system is preferably positioned between two rows of filter compartments and utilizes the gas inlet manifold and gas outlet manifold which extend between the two rows, each row containing a plurality of filter compartments. The gas inlet manifold which distributes particulate-laden gas to the gas inlet of each filter compartment, has a common wall with the gas outlet manifold which receives filtered gas from each of the filter compartments and distributes the filtered gas to a baghouse gas outlet which generally directs gas to a stack or to other gas treatment components. In accordance with the present invention, it is critical that poppet damper means be utilized in the internal gas bypass system to isolate the gas inlet manifold from the gas outlet manifold. The gas-tight poppet dampers are suitably mounted on the internal plate which is common to both the inlet gas manifold and the outlet gas manifold. Generally, the common plate defines the top wall of the gas inlet manifold and the bottom wall of the gas outlet manifold. By providing communication between the gas inlet manifold and the gas outlet manifold, the filter compartments can be isolated from the inlet gas stream during start-ups and/or shut-downs, during boiler upset conditions, during excessive temperature peaks, and the like, thus avoiding damage to the fabric and/or to the bags themselves or other components in the filter compartments. The system also protects the boiler from backpressure due to excessive pressure loss across the system.

The internal gas bypass system of the present invention also heats the gas inlet manifold to a temperature at or near the temperature of the particulate-laden gas, and thereby reduces the risk of vapors in the flue gas condensing out in the gas inlet manifold and/or in the cold filter compartments after the system has been shut down for an extended period of time. Thus, in accordance with at least some of the objects of the present invention, there is provided a method of heating the gas inlet manifold in a baghouse filter system having a plurality of filter compartments, each compartment having a gas inlet for receiving heated, particulate-laden gas, a gas outlet for delivering filtered gas, fabric filter means between the gas inlet and the gas outlet and means for selectively blocking the gas inlet of each compartment; a gas inlet manifold connected to a source of heated, particulate-laden gas and to the gas inlet of a plurality of filter compartments and a gas outlet manifold connected to the gas outlet of a plurality of filter compartments and to a baghouse clean gas outlet, comprising:

(a) providing a common wall between the gas inlet manifold and the gas outlet manifold, whereby the top plate of the gas inlet manifold is the bottom plate of the gas outlet manifold;

(b) providing at least one poppet damper means in the common wall to provide an internal bypass means for passing particulate-laden gas from the gas inlet manifold to the gas outlet manifold;

(c) blocking the gas inlet of a plurality of the filter compartments and opening the poppet damper means in the common wall; and (d) passing the heated, particulate-laden gas from the source of heated, particulate-laden gas to the gas inlet manifold through the open poppet damper means into the gas outlet manifold, whereby the gas inlet manifold is heated by the heat in the heated particulate-laden gas before the heated particulate-laden gas is passed into a plurality of the filter compartments.

In the prior art baghouse filter systems which have an external flue gas bypass system, the flue gas bypass system is typically located at the inlet side or end of the baghouse so that the heated, particulate-laden flue gas never enters the gas inlet manifold of the baghouse when the flue gas bypass system is activated. The heated, particulate-laden gas proceeds directly to the gas outlet manifold and then to the stack or other components, thereby circumventing the gas inlet manifold. Thus, such prior art systems do not provide any mechanism for pre-heating or heating the gas inlet manifold and adjacent components.

BRIEF DESCRIPTION OF THE DRAWINGS

While the novel features of the invention are set forth with particularity in the appended claims, the invention will be better understood and appreciated from the following detailed description taken in conjunction with the drawings, in which:

DETAILED DESCRIPTION OF THE INVENTION

Figure 1:
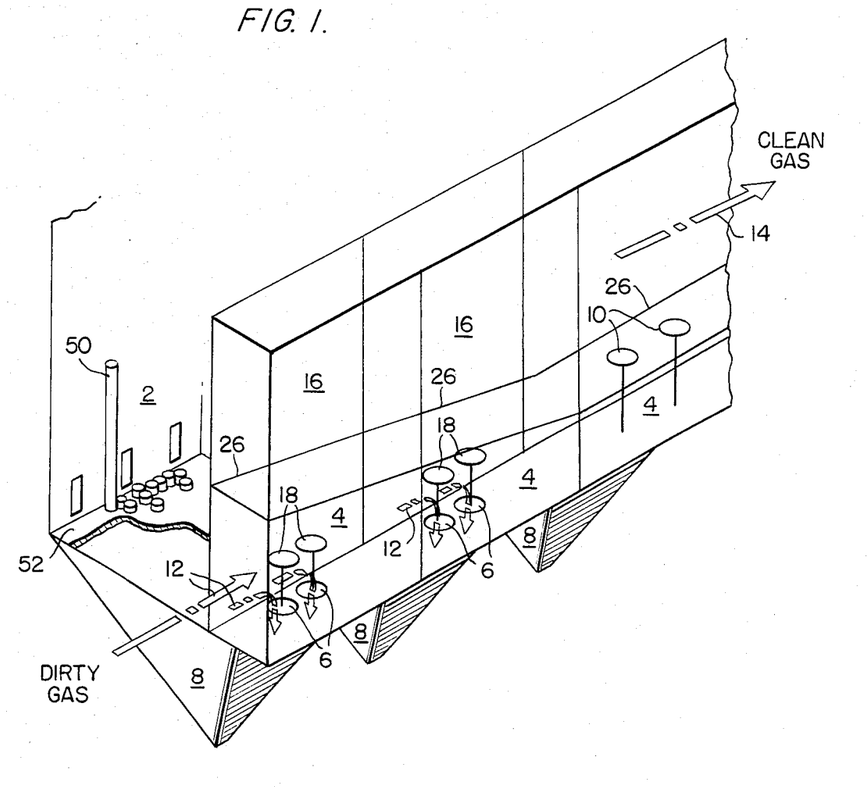
FIG. 1 is a perspective and partially schematic view of a baghouse having multiple compartments showing the position of a gas inlet manifold relative to a gas outlet manifold and internal bypass means.

Referring to the drawings, FIG. 1 illustrates a section of a baghouse installation having a row of vertically oriented compartments 2. Although it is not shown in the perspective view, a typical baghouse installation comprises two rows of vertically oriented compartments 2 having duct work and other related devices positioned between the two rows.

Dirty gas from a source (not shown), for example, from a coal fired power plant, is carried through appropriate duct work to gas inlet manifold 4 in the direction of arrow 12. When particulate matter is being removed from the dirty gas, the particulate-laden gas passes through gas inlet 6 into hopper 8 of compartment 2. Each compartment 2 has at least one such gas inlet 6, generally designated herein as a gas inlet or gas inlet duct. The flow of gas in gas inlet 6 as illustrated in FIG. 1, shows means 18 for selectively blocking gas inlet 6. As illustrated in FIG. 1, poppet damper means 18 are used as the means for selectively blocking gas inlet 6, and poppet damper means 18 is in an open position to permit the flow of dirty gas through gas inlet 6 into filter compartment 2 through hopper 8.

Each compartment 2 is of conventional internal construction and is not described in detail herein. It is well known in the art that the particulate-laden gas or dirty gas flows into the fabric filter means, generally described as filter bags 50 and through the fabric to be cleaned thereby. Coventional filter bags are illustrated and described in U.S. Pat. No. 3,955,947. Some of the particulate matter in the dirty gas or particulate-laden gas falls into hoppers 8 and is removed therefrom by a suitable dust-removal system (not shown). The bulk of the particulate matter from the particulate-laden gas becomes lodged upon and within the surface of the filter bags or in the interstices of the fabric. Cleaned (filtered) gas flows from the upper end of compartments 2 through conventional gas outlets or gas outlet ducts (not shown) into a cleaned or filtered gas outlet manifold, designated herein as gas outlet manifold 16. The cleaned gas flows from gas outlet manifold 16 into the atmosphere, or it may be used for various other purposes, for example, as cleaning gas for use in a reverse gas manifold (not shown) used to remove particulate matter adhering to the filter bags 50. As shown in FIG. 1, cleaned gas or filtered gas flows in the direction or arrow 14 in gas outlet manifold 16. In an alternative embodiment discussed in detail below, cleaned gas or filtered gas flows in gas outlet manifold 16 in a direction opposite the direction of arrow 14 and exits gas outlet manifold 16 through exit means provided in gas outlet manifold 16 at a point located in the end of gas outlet manifold 16 proximal arrow 12, that is, the dirty gas inlet and the clean gas outlet are both at the same end of the baghouse.

Blowers (not shown) may be used to propel the particulate-laden gas through the filter system, and the pressure side of a suitable blower may be used to propel the particulate-laden gas into gas inlet manifold 4, or the suction side of a suitable blower may be used to draw the gas through the system on the cleaned or filtered gas side of the filter system in the direction of arrow 14 at gas outlet manifold 16.

In accordance with at least some of the objects of the present invention, there is provided a gas outlet manifold connected to the gas outlet of a plurality of filter compartments and to a baghouse clean gas outlet, at least a portion of the gas outlet manifold having a common wall with the gas inlet manifold such that the gas outlet manifold is mounted internally in the baghouse adjacent the gas inlet manifold, and at least one poppet damper means in the common wall, thereby providing an internal bypass means for passing particulate-laden gas from the gas inlet manifold to the gas outlet manifold. In FIG. 1, gas outlet manifold 16 is connected to the gas outlet (not shown in FIG. 1) of a plurality of filter compartments 2 and to a baghouse clean gas outlet (not shown in FIG. 1), and at least a portion of the gas outlet manifold 16 has a common wall 26 with gas inlet manifold 4, whereby gas outlet manifold 16 is mounted internally in the baghouse adjacent gas inlet manifold 4. At least one poppet damper means 10 in common wall 26 provides an internal bypass means for passing particulate-laden gas from gas inlet manifold 4 to gas outlet manifold 16. As shown, gas outlet manifold 16 is positioned above gas inlet manifold 4, and common wall 26 forms the lower plate of gas outlet manifold 16 and the upper plate of gas inlet manifold 4.

In a preferred embodiment of the present invention, the top plate of gas inlet manifold 4 common to the bottom plate of gas outlet manifold 16, namely, common wall 26, slopes downwardly from the end of gas inlet manifold 4 proximal the source of particulate-laden gas, that is, common wall 26 of gas inlet manifold 4 slopes downwardly from about that point where dirty gas enters gas inlet manifold 4, as shown by arrow 12, to the end of gas inlet manifold 4 distal the source of particulate-laden gas. Thus, the end of gas inlet manifold 4 proximal the source of particulate-laden gas, has a cross-sectional area larger than the distal end of gas inlet manifold 4, and the end of gas outlet manifold 16 disposed above or in juxtaposition with the end of gas inlet manifold 4 proximal the dirty gas inlet has a cross-sectional area smaller than the end of gas outlet manifold 16 in juxtaposition with the distal end of gas inlet manifold 4. Alternatively stated, in preferred embodiments the top wall of the gas inlet manifold is inclined in order to reduce the cross-section of the gas inlet manifold progressively away from the inlet end connected to the source of particulate-laden gas, and the bottom wall of the gas outlet manifold progressively increases in cross-section in the direction of gas flow and is of maximum size at the end of the duct which is the opposite end of the gas inlet for the source of particulate-laden gas. In a preferred embodiment of the internal gas by-pass means of the present invention, poppet damper means 10 in common wall 26 is positioned near the end of gas inlet manifold 4 distal the source of particulate-laden gas, and bypass gas exits the gas inlet manifold 4 and enters gas outlet manifold 16 at a position distal the location of the source of particulate-laden.

As used herein, the end of the gas inlet manifold proximal the source of particulate-laden gas is that end of gas inlet manifold 4 where dirty gas (particulate-laden gas or heated, particulate-laden gas) enters gas inlet manifold 4 as designated by arrow 12 in FIG. 1. As used herein, the distal end of the gas inlet manifold is that end of gas inlet manifold 4 which is most distant from that point in gas inlet manifold 4 where dirty gas or particulate-laden gas enters gas inlet manifold 4 as designated by arrow 12 in FIG. 1. The corresponding designations are also used to define the ends of gas outlet manifold 16.

Although the position of the poppet damper means in the common wall is not critical in the baghouse filter system of the present invention to provide an internal bypass means for passing particulate-laden gas from the gas inlet manifold to the gas outlet manifold, in preferred embodiments, the poppet damper means is located in the common wall near the end of the gas inlet manifold distal the particulate-laden gas source. Thus, in preferred embodiments, the top plate of gas inlet manifold 4, common to the bottom plate of gas outlet manifold 16 has at least one poppet damper means 10 located therein to provide the internal bypass means of the present invention.

In one of the preferred embodiments of the present invention, the top plate of gas inlet manifold 4 common to the bottom plate of gas outlet manifold 16 slopes downwardly from the end of gas inlet manifold 4 proximal the particulate-laden gas source toward the end of gas inlet manifold 4 distal the particulate-laden gas source and terminates in a substantially non-sloping section at the end of gas inlet manifold 4 distal the particulate-laden gas source. Although it is not critical to provide a slope in the common wall of the gas inlet manifold and the gas outlet manifold, and accordingly, the present invention embraces a non-sloping common wall, it is most preferred to provide a sloping common wall which terminates in a substantially non-sloping wall 26 as described above in order to promote the dynamic flow of particulate-laden gas entering the gas inlet manifold and to promote the dynamic flow of particulate-laden gas from the gas inlet manifold into the gas inlets of a plurality of filter compartments. Generally, in the most preferred embodiments, the substantially non-sloping section in common wall 26 at the end of the gas inlet manifold 4 distal the particulate-laden gas source is the section of the gas inlet manifold 4 which provides particulate-laden gas to 1 to about 3 filter compartments on each side of gas inlet manifold 4. At least one poppet damper means is positioned in the plate common to gas inlet manifold 4 and gas outlet manifold 16, namely, common wall or plate 26, in the substantially non-sloping section described above. However, regardless of the section of common wall 26 in which poppet damper means 10 is positioned, the means in the common wall to accommodate poppet damper means 10 is preferably a non-sloping segment of the common wall 26, that is, a non-sloping segment of the top plate of gas inlet manifold 4 and of the common bottom plate of gas outlet manifold 16.

In FIG. 1, it can be seen that means for selectively blocking the gas inlet of each compartment are shown in gas inlet manifold 4. Poppet damper means 18 are provided in gas inlet manifold 4 to selectively block gas inlet 6 of each compartment 2. When poppet damper means 18 are in an open position, particulate-laden gas enters hopper 8 through gas inlet 6, and the particulate-laden gas passes through fabric filter means 50 into filter compartment 2. Although it is not shown in FIG. 1, filtered gas, as it exits fabric filter means 50, passes into gas outlet manifold 16, and the filtered or cleaned gas exits gas outlet manifold 16 in the direction of arrow 14 to suitable disposal means.

Figure 2:
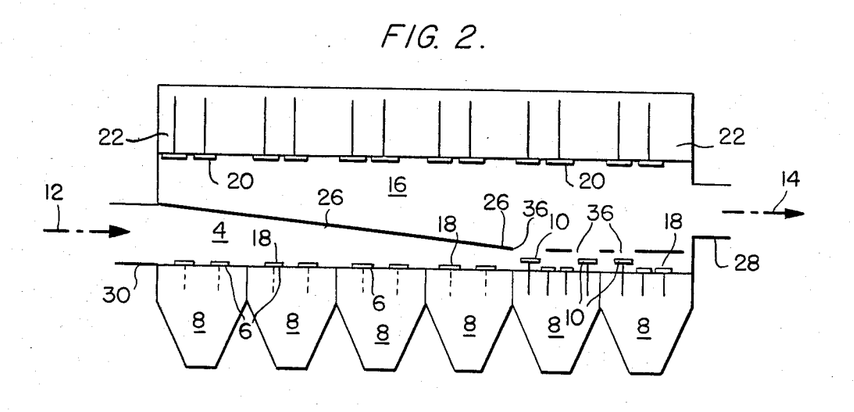
FIG. 2 is a longitudinal cross section of a baghouse showing an inlet gas manifold, an outlet gas manifold and an internal bypass means.

Referring to FIG. 2, gas inlet manifold 4 is shown in communication with gas outlet manifold 16 through means in common wall 26 to accommodate poppet damper means 10. Poppet damper means 10 are shown in an open position and particulate-laden gas entering baghouse gas inlet 30 in the direction of arrow 12 flows through gas inlet manifold 4 and into gas outlet manifold 16 through opening 36, otherwise designated herein as means in the common wall 26 to accommodate poppet damper means 10, the means in the common wall to accommodate poppet damper means 10 generally being a valve seat for seating poppet damper means 10 as well-known in the art. Particulate-laden gas which enters gas outlet manifold 16 then exits the baghouse through baghouse gas outlet 28 in the direction of arrow 14. Also shown in FIG. 2 are poppet damper means 20 for permitting the flow of filtered gas from the gas outlet 22 of compartment 2 and for preventing the flow of bypass gas into filter compartments 2. Thus, means are also provided for selectively blocking the gas outlet of each compartment. Poppet damper means 18 in gas inlet manifold 4 and poppet damper means 20 at gas outlet 22 are shown in a closed position and thereby block the flow of particulate-laden gas into gas inlet 6 and into filter compartment 2. Thus, in the configuration shown in FIG. 2, the particulate-laden gas flows in the internal bypass means provided by the baghouse filter system of the present invention.

Figure 3:
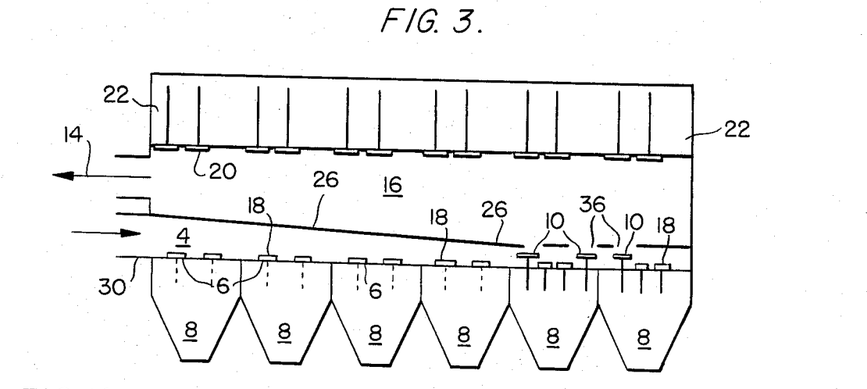
FIG. 3 is a longitudinal cross section of a baghouse showing an inlet gas manifold, an alternative embodiment of the gas outlet manifold and an internal bypass means.

Referring to FIG. 3, gas inlet manifold 4 is shown in communication with gas outlet manifold 16 through means in common wall 26 to accommodate poppet damper means 10. Poppet damper means 10 are shown in an open position and particulate-laden gas entering baghouse gas inlet 30 in the direction of arrow 12 flows through gas inlet manifold 4 and into gas outlet manifold 16 through opening 36, otherwise designated herein as means in the common wall 26 to accommodate poppet damper means 10, the means in the common wall to accommodate poppet damper means 10 generally being a valve seat for seating poppet damper means 10 as well-known in the art. Particulate-laden gas which enters gas outlet manifold 16 then exits the baghouse through baghouse gas outlet 28 in the direction of arrow 14. In this embodiment in FIG. 3 baghouse gas outlet 28 is in the same end of the baghouse as baghouse gas inlet 30, that is, baghouse gas outlet 28 is in the end of the baghouse proximal baghouse gas inlet 30. In the preferred embodiment of FIG. 3, both gas inlet manifold 4 and gas outlet manifold 16 are preheated when the heated, particulate-laden gas passes therethrough. Also shown in FIG. 3 are poppet damper means 18 and 20 which function in the same manner described relative to FIG. 2 above. In the configuration shown in FIG. 3, the particulate-laden gas flows in the internal bypass means provided by the baghouse filter system of the present invention.

Figure 4:
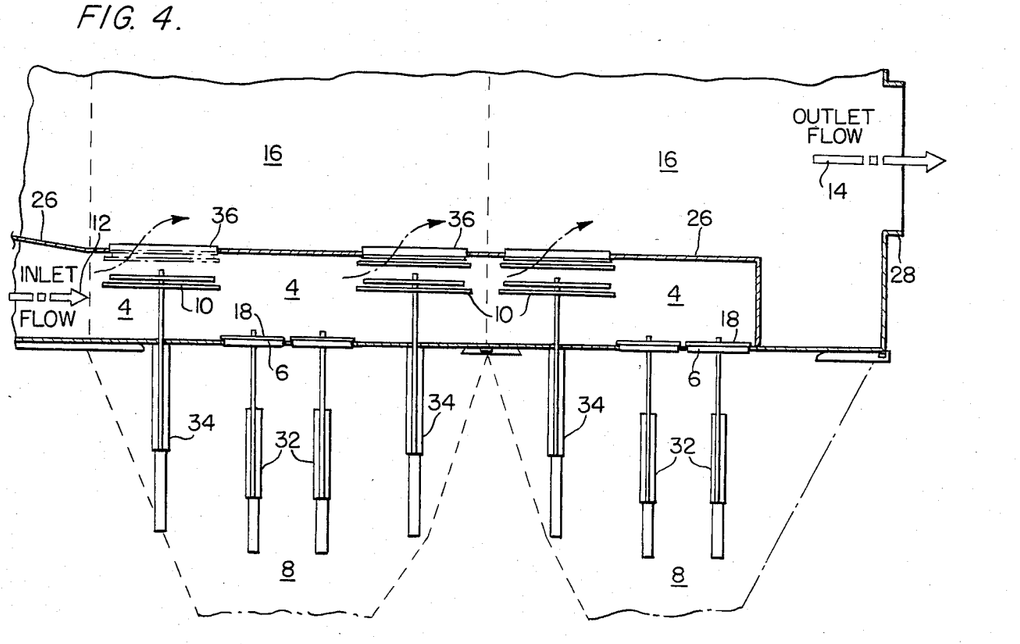
FIG. 4 is a magnified cross-sectional view of the duct work and poppet damper means serving the two filter compartments most distal from the gas inlet.

FIG. 4 illustrates a preferred embodiment of the present invention wherein the poppet damper means in the common wall is positioned near the end of the gas inlet manifold distal the source of particulate-laden gas whereby bypass gas exits the gas inlet manifold and enters the gas outlet manifold at a position distal the location of the source of particulate-laden gas. Poppet damper means 10 are shown in an open position, and particulate-laden gas flowing in the direction of arrow 12 passes through gas inlet manifold 4 through orifice or opening 36 into gas outlet manifold 16, and exits gas manifold 16 through baghouse gas outlet 28. FIG. 4 illustrates the location of means 36 in common wall 26 to accommodate poppet damper means 10, and also illustrates poppet damper means 18 in a closed position to prevent the flow of particulate-laden gas into gas inlet 6. Numerals 32 and 34 illustrate conventional translational means through which poppet dampers 18 and 10, respectively, are controlled.

Figure 5:
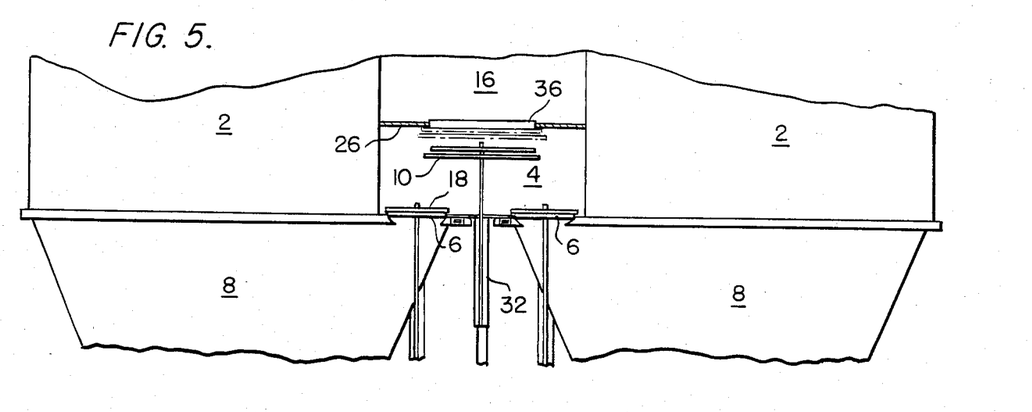
FIG. 5 is a cross-sectional view of the lower portion of a baghouse as viewed from the end of the baghouse showing the duct work of the invention relative to two rows of filter compartments.

FIG. 5 shows a preferred embodiment of the present invention from a cross-sectional view of the baghouse as taken from an end view. Gas inlet manifold 4 is shown in communication with gas outlet manifold 16 through orifice or port 36 adapted to receive poppet damper means 10. Gas inlet manifold 4 and gas outlet manifold 16 are shown between two rows of filter compartments 2. In accordance with the embodiment shown in FIG. 5, the baghouse filter system is divided into a pair of spaced housings, each of which contains a plurality of filter compartments 2. The housings thus provide a pair of spaced walls which are generally parallel and co-extensive with each other and which may be utilized to form in part the various gas ducts including gas inlet manifold 4 and gas outlet manifold 16. A first wall cooperates with the housings to define an inlet duct 4 (gas inlet manifold) which has one wall in common with each of the housings forming compartments 2. Inlet duct 4 includes means at one end to connect the source of particulate-laden gas which is to be cleaned, and gas inlet 6 to discharge or convey the particulate-laden gas into each of the compartments through hoppers 8. A second wall means extends between the housings to define an outlet duct between the two housings and which also has one wall in common with each of the housings forming compartments 2. Common wall 26 is shown immediately adjoining inlet gas manifold duct 4 and outlet gas duct 16. The outlet duct 16 receives cleaned gas (not shown) from the compartments 2 in each housing and discharges the cleaned gas from the gas outlet manifold duct 16 at one end thereof.

In various embodiments of the present invention, it is also possible to incorporate other ducts, such as, a reverse air duct for cleaning filter elements in compartments 2, and the like. Furthermore, all poppet damper means and other elements of the system can be controlled manually or automatically as desired. Any conventional poppet damper means may be used in the gas bypass system of the present invention. For example, poppet damper means 10 may be constructed in accordance with those described and claimed in U.S. Pat. No. 4,360,370, incorporated herein by reference. Although poppet damper means 18 and 20 are the preferred devices for controlling gas flow in the gas inlets and gas outlets, respectively, other well-known means, such as, butterfly valves and louvers, may be used in place of poppet damper means for selectively blocking gas inlet 6 and gas outlet 22. However, in accordance with the present invention, it is critical to use poppet damper means as the poppet damper means 10 in common wall 26 to provide the internal gas bypass system.

Generally, the particulate-laden gas entering the baghouse is derived from a heated source wherein the particulate-laden gas contains substantial amounts of heat. The heated, particulate-laden gas may range from ambient temperature up to about 1500° C. In many cases, especially after the baghouse has been shut down for cleaning and maintenance and the like, it is desirable to heat the duct work and compartments therein to prevent condensation in the duct work when the hot gases pass through colled duct work. Accordingly, it is desirable to heat as much of the duct work, adjacent elements and compartments as possible prior to start up of the baghouse for the filtration of particulate matter from the heated, particulate-laden gases. The internal bypass system of the present invention provides an improved method of heating the gas inlet manifold, in certain embodiments the gas outlet manifold and various other components in proximity with the gas inlet manifold and/or gas outlet manifold from the heat contained in the particulate-laden gas derived from the source of particulate-laden gas. Thus, when an internal bypass system is provided in accordance with the present invention, the internal duct work and systems which communicate therewith, can be heated prior to the introduction of the heated, particulate-laden gas into the filter compartments. Thus, in the apparatus of the present invention, by providing a common wall between the gas inlet manifold and the gas outlet manifold, whereby the top plate of the gas inlet manifold is the bottom plate of the gas outlet manifold; by providing at least one poppet damper means in the common wall to provide an internal bypass means for passing heated, particulate-laden gas from the gas inlet manifold to the gas outlet manifold; by blocking the gas inlet of a plurality of filter compartments and opening the poppet damper means in the common wall, and by passing the heated, particulate-laden gas from the source of heated, particulate-laden gas to the gas inlet manifold through the open poppet damper means into the gas outlet manifold, the gas inlet manifold and, optionally, the gas outlet manifold, are heated by the heat in the heated, particulate-laden gas, and the areas of the filter compartments are heated because of their proximity to the heated gas inlet manifold and gas outlet manifold before the particulate-laden gas is passed into the filter compartments. When the internal system is utilized, it is preferred that the gas outlets of the filter compartments be closed to prevent possible damage to the filter bags.

When the gas outlet of each compartment is blocked, for example, by closing the poppet damper means, all heated, particulate-laden gas is passed from the gas inlet manifold to the gas outlet manifold, and heat contained in the particulate-laden gas is transferred to the duct work and to the areas of the baghouse surrounding the duct work. After the gas inlet manifold and the surrounding duct work and compartments have reached the desired temperature, the gas inlet of a plurality of filter compartments can be selectively opened, and the poppet damper means in the common wall can be closed, and the heated particulate-laden gas from the source of heated particulate-laden gas thereafter passes into the gas inlet manifold, through the plurality of filter compartments to remove particulate matter therefrom without undesirable condensation of moisture and other vaporized components of the heated, particulate-laden gas. The gas inlet manifold and the surrounding areas generally are heated from a temperature of about ambient to the temperature of the heated, particulate-laden gas, and generally to a temperature of about 30° C. to a temperature of about 800° C. In the process of the present invention, when the bypass gas exits the gas inlet manifold and enters the gas outlet manifold at a position distal the location of the source of the heated, particulate-laden gas, the entire gas inlet manifold can be heated from the heat contained in the heated, particulate-laden gas. When the bypass gas exits the gas outlet manifold at a baghouse gas outlet located in the same end of the baghouse as the dirty gas inlet, that is when the baghouse clean gas exit is located at the end of the baghouse proximal the dirty gas inlet, the entire gas outlet manifold can also be heated from the heat contained in the heated, particulate-laden gas. In this embodiment, the heated, particulate-laden gas passes from the gas inlet manifold into the gas outlet manifold and thereafter passes through the entire gas outlet manifold, thereby heating the gas outlet manifold and the gas inlet manifold. Thus, the gas inlet manifold and the gas outlet manifold are heated from a temperature of about ambient to the temperature of the heated, particulate-laden gas. In certain embodiments, the gas inlet manifold and gas outlet manifold are heated at a temperature between about 30° C. and 800° C.

In accordance with the present invention, a baghouse filter system having internal bypass means for enabling the direct passage of particulate-laden gases from a boiler or other source of particulate-laden gases to the outlet end of the baghouse filter system, has been provided. This reduces the size of the baghouse units which normally have an external gas bypass system. Furthermore, it provides a method of heating the duct work and other components of the baghouse system to prevent condensation of vapors contained in the heated, particulate-laden gases.

Although the interior of compartments 2 has not been described with any particular detail above, normally, the interior of compartment 2 is conventional and contains multiple fabric filter means, such as filter bags, as shown in U.S. Pat. No. 3,955,947.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A baghouse filter system comprising:
    (a) a plurality of filter compartments each having a gas inlet for receiving particulate-laden gas, a gas outlet for delivering filtered gas, fabric filter means between the gas inlet and the gas outlet and means for selectively blocking the gas inlet of each compartment;
    (b) a gas inlet manifold mounted internally in the baghouse and connected to a source of particulate-laden gas and to the gas inlet of a plurality of filter compartments;
    (c) a gas outlet manifold connected to the gas outlet of a plurality of filter compartments and to a baghouse clean gas outlet, the gas outlet manifold having a common wall with the gas inlet manifold, the gas outlet manifold being mounted internally in the baghouse adjacent the gas inlet manifold; and (d) at least one poppet damper means in the common wall, thereby providing an internal bypass means for passing particulate-laden gas from the gas inlet manifold to the gas outlet manifold.

2. The baghouse filter system of claim 1 wherein the gas outlet manifold mounted internally in the baghouse is positioned above the gas inlet manifold mounted internally in the baghouse and the common wall forms the lower plate of the gas outlet manifold and the upper plate of the gas inlet manifold in the longitudinal direction of the gas inlet manifold.

3. The baghouse filter system of claim 1 wherein the means for selectively blocking the gas inlet of each compartment is at least one poppet damper.

4. The baghouse filter system of claim 1 wherein the gas outlet manifold and the gas inlet manifold are positioned between two rows of filter compartments.

5. The baghouse filter system of claim 1 wherein the top plate of the gas inlet manifold common to the bottom plate of the gas outlet manifold, slopes downwardly from the end of the gas inlet manifold proximal the source of particulate-laden gas to the end of the gas inlet manifold distal the source of particulate-laden gas, whereby the end of the gas inlet manifold proximal the source of particulate-laden gas has a cross-sectional area larger than the distal end of the gas inlet manifold, and the end of the gas outlet manifold in juxtaposition with the proximal end of the gas inlet manifold has a cross-sectional area smaller than the end of the gas outlet manifold in juxtaposition with the distal end of the gas inlet manifold.

6. The baghouse filter system of claim 5 wherein the poppet damper means in the common wall is positioned near the end of the gas inlet manifold distal the source of particulate-laden gas, whereby bypass gas exits the gas inlet manifold and enters the gas outlet manifold at a position distal the location of the source of particulate-laden gas.

7. The baghouse filter system of claim 5 further comprising means in the common wall to accommodate the poppet damper means.

8. The baghouse filter system of claim 7 wherein the means in the common wall to accommodate the poppet damper means is a substantially non-sloping segment of the top plate of the gas inlet manifold.

9. The baghouse filter system of claim 1 wherein the top plate of the gas inlet manifold common to the bottom plate of the gas outlet manifold, slopes downwardly from the end of the manifold proximal the particulate-laden gas source toward the end of the manifold distal the particulate-laden gas source and terminates in a substantially non-sloping section at the end of the manifold distal the particulate-laden gas source.

10. The baghouse filter system of claim 9 wherein the substantially non-sloping section at the end of the gas inlet manifold distal the particulate-laden gas source is the section of the manifold which provides particulate-laden gas to 1 to about 3 filter compartments on each side of the manifold.

11. The baghouse filter system of claim 9 wherein at least one poppet damper means is positioned in the plate common to the gas inlet manifold and the gas outlet manifold in the substantially non-sloping section.

12. The baghouse filter system of claim 1 wherein the baghouse clean gas outlet is at the end of the gas outlet manifold proximal the end of the gas inlet manifold connected to the source of particulate-laden gas.

13. The baghouse filter system of claim 1 wherein the baghouse clean gas outlet is at the end of the gas outlet manifold distal the end of the gas inlet manifold connected to the source of particulate-laden gas.

14. A method of heating the gas inlet manifold in a baghouse filter system having a plurality of filter compartments each having a gas inlet for receiving heated, particulate-laden gas, a gas outlet for delivering filtered gas, fabric filter means between the gas inlet and the gas outlet, means for selectively blocking the gas inlet of each compartment, a gas inlet manifold connected to a source of heated, particulate-laden gas and to the gas inlet of a plurality of filter compartments and a gas outlet manifold connected to the gas outlet of a plurality of filter compartments and to a baghouse clean gas outlet, comprising (a) providing a common wall between the gas inlet manifold and the gas outlet manifold, whereby the top plate of the gas inlet manifold is the bottom plate of the gas outlet manifold;

(b) providing at least one poppet damper means in the common wall to provide an internal bypass means for passing heated, particulate-laden gas from the gas inlet manifold to the gas outlet manifold;

(c) blocking the gas inlet of a plurality of the filter compartments and opening the poppet damper means in the common wall; and (d) passing the heated, particulate-laden gas from the source of heated, particulate-laden gas to the gas inlet manifold through the open poppet damper means into the gas outlet manifold, whereby the gas inlet manifold is heated by the heat in the heated, particulate-laden gas before the heated, paticulate-laden gas is passed into a plurality of the filter compartments.

15. The method of claim 14 comprising blocking the gas inlet of each compartment and passing all heated, particulate-laden gas from the gas inlet manifold to the gas outlet manifold.

16. The method of claim 14 further comprising selectively opening the gas inlet of a plurality of filter compartments after the gas inlet manifold has been heated to the desired temperature, and closing the poppet damper means in the common wall, whereby heated, particulate-laden gas passes into the gas inlet manifold, through the plurality of filter compartments to remove particulate matter therefrom and into the gas outlet manifold.

17. The method of claim 14 wherein the gas inlet manifold is heated from a temperature of about ambient to the temperature of the heated particulate-laden gas.

18. The method of claim 17 wherein the gas inlet manifold is heated at a temperature of about 30° C. to a temperature of about 800° C.

19. The method of claim 14 comprising providing the poppet damper means in the common wall near the end of the gas inlet manifold distal the source of heated, particulate-laden gas, whereby bypass gas exits the gas inlet manifold and enters the gas outlet manifold at a position distal the location of the source of the heated, particulate-laden gas, thereby heating the entire gas inlet manifold.

20. The method of claim 14 further comprising passing the heated, particulate-laden gas from the gas inlet manifold into the gas outlet manifold and thereafter passing the heated, particulate-laden gas through the gas outlet manifold, thereby heating the gas outlet manifold and the gas inlet manifold.

21. The method of claim 20 wherein the gas inlet manifold and the gas outlet manifold are heated from a temperature of about ambient to the temperature of the heated, particulate-laden gas.

22. The method of claim 20 wherein the gas inlet manifold and the gas outlet manifold are heated at a temperature of about 30° C. to a temperature of about 800° C.

* * * * *